R. HUFF.
STEERING GEAR FOR MOTOR VEHICLES.
APPLICATION FILED FEB. 5, 1912.
1,124,444.
Patented Jan. 12, 1915.
2 SHEETS—SHEET 1.
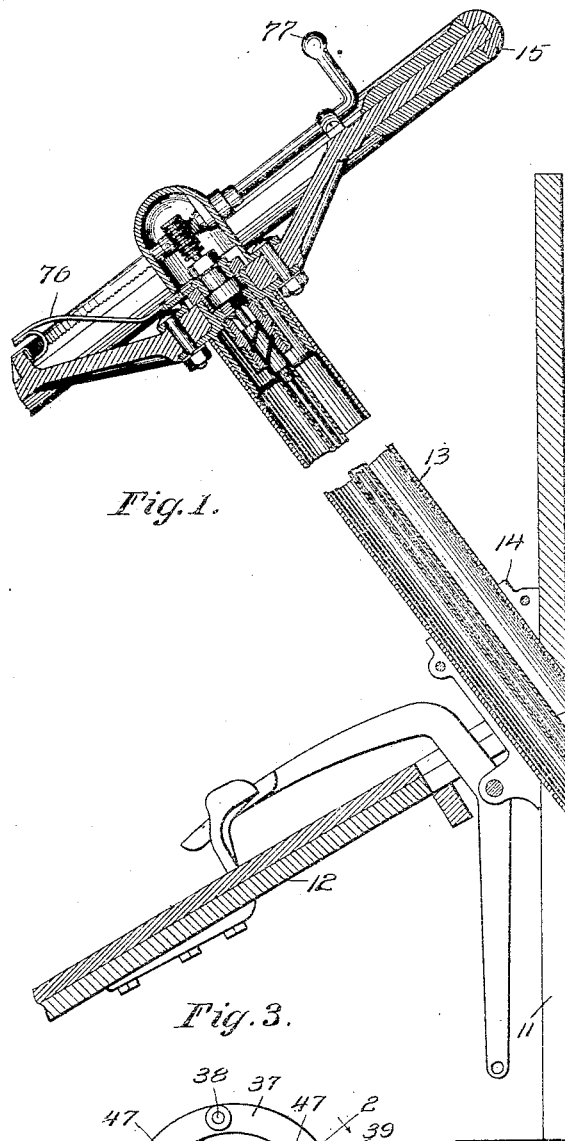
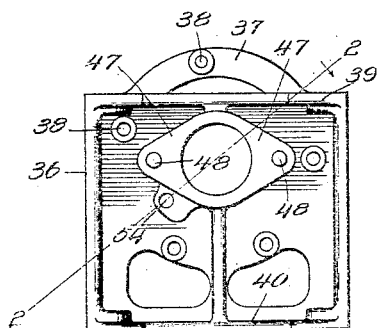
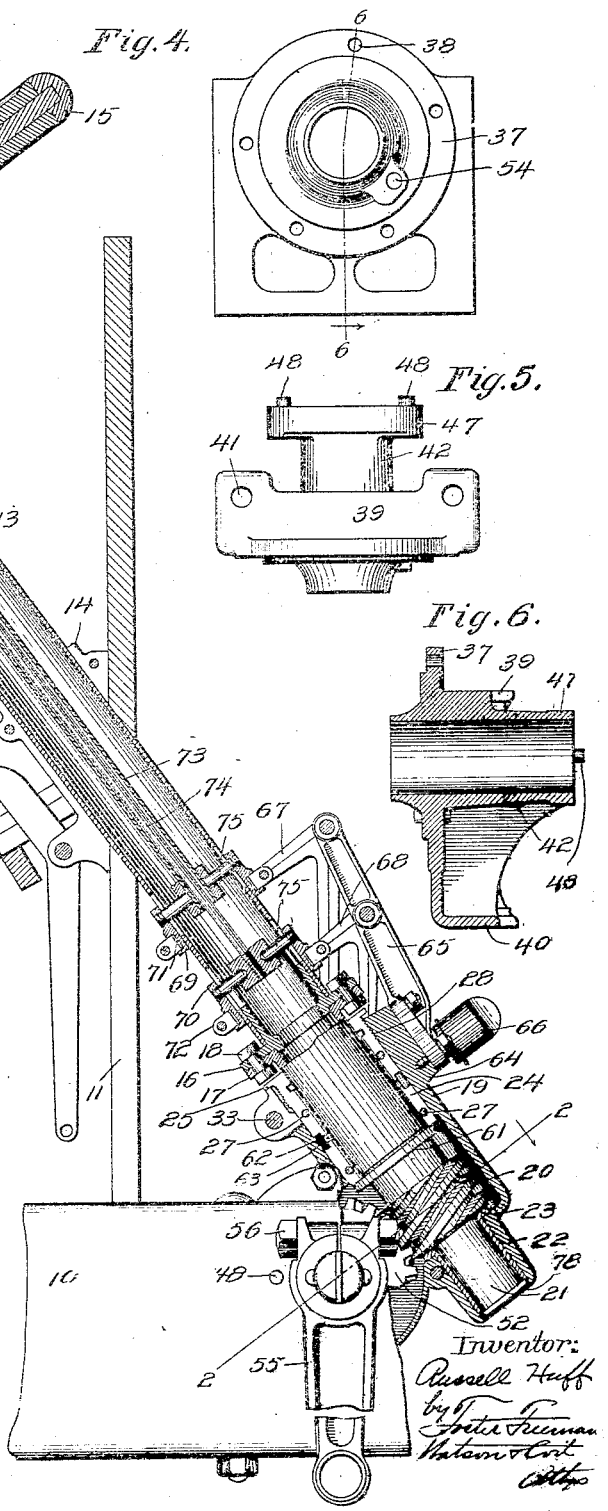

R. HUFF.
STEERING GEAR FOR MOTOR VEHICLES.
APPLICATION FILED FEB. 5, 1912.
1,124,444.
Patented Jan. 12, 1915.
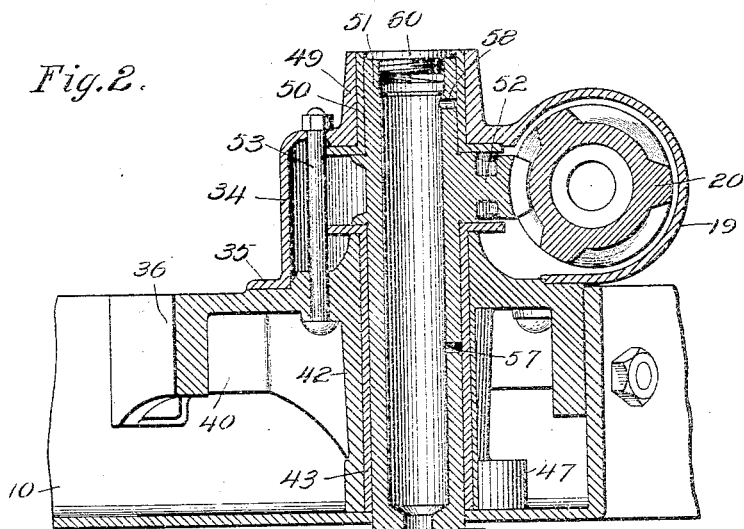
Fig. 2.
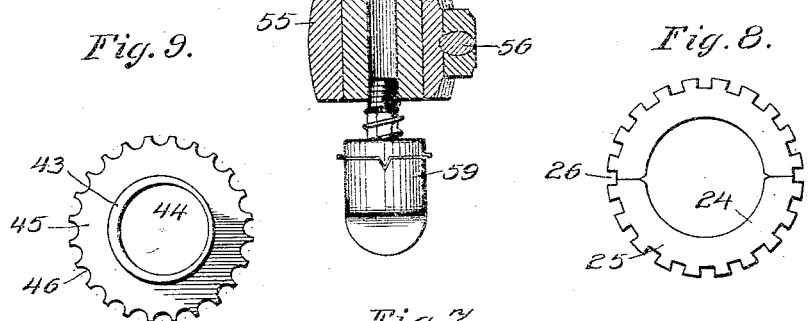
Fig. 9. Fig. 8.
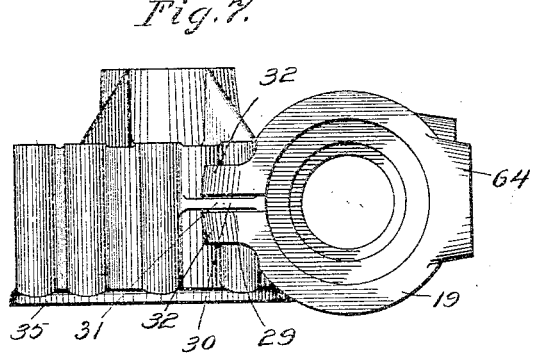
Fig. 7.
Fig. 10.
WITNESSES
B. M. Kent.
C. D. Brown
INVENTOR
Russell Huff
by Foster Freeman Watson & Cert
Attorneys

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

STEERING-GEAR FOR MOTOR-VEHICLES.

1,124,444.  Specification of Letters Patent.  Patented Jan. 12, 1915.

Application filed February 5, 1912. Serial No. 675,543.

*To all whom it may concern:*

Be it known that I, RUSSELL HUFF, a citizen of the United States, and resident of Detroit, county of Wayne, State of Michigan, have invented certain new and useful Improvements in Steering-Gears for Motor-Vehicles, of which the following is a specification.

This invention relates to motor vehicles and more particularly to improvements in the steering mechanism therefor.

The objects of the invention are to provide a steering mechanism which is supported on the frame of the vehicle and permits the removal of the motor without dismantling the steering mechanism, and to provide a mechanism employing the usual sector gear and screw in which the sector gear is located on the underside of the steering column and the operating connections for the spark and throttle levers are located above the screw.

Another object of the invention is to provide a supporting bracket and a housing for the lower end of the steering column supported on the bracket and adapted to be swung to different positions thereon, so as to permit the steering column to be arranged at any desired angle.

The novel features of the invention will be apparent from the following description, taken in connection with the accompanying drawings, in which, Figure 1 is a longitudinal section of a steering column, with adjacent portions of the vehicle shown in elevation; Fig. 2 is a transverse section on the line 2—2 of Figs. 1 and 3; Fig. 3 is an elevation of the frame side of a bracket supporting the steering column housing; Fig. 4 is an elevation of the opposite side of said bracket; Fig. 5 is a top plan, and Fig. 6 is a section on the line 6—6 of the bracket; Fig. 7 is a top plan of the steering column housing looking in the direction of the axis of the steering column; Fig. 8 is a plan view of one of the bushings for the steering column housing; Fig. 9 is an end view of one of the bushings for the sector shaft; Fig. 10 is an elevation of a detail.

Referring to the drawings, 10 indicates one of the side frames of the vehicle, 11 the dash and 12 a portion of the floor. A tubular steering column or post 13 is arranged in a bracket 14 secured to the dash and carries on its upper end the steering wheel 15. The steering column is divided into two sections which have their flanges 16 and 17 secured together by means of bolts 18. The lower section of the steering column is arranged in a housing 19 and is provided with the usual screw 20. The lower end of the lower section of the steering column is provided with a journal 21 which is arranged in a bushing 22 carried by the housing 19. The bushing 22 has a flange 23 at its upper end, this flange forming a thrust bearing for the screw. The upper portion of the lower section of the steering column is journaled in the split bushing 24 which is provided with an annular flange 25 on its upper end. Notches 26 are formed in the periphery of the flange 25. The parts of the bushing 24 are held together by means of dowel pins 27 and the upper portion of the bushing has screw threaded engagement with the housing 19 as indicated at 28. The housing has a longitudinally arranged slit 29 at its upper end in which is arranged a key 30 having an upward projection 31 which is adapted to engage one of the notches 26 in the flange of the bushing 24 to lock the bushing in any adjusted position. The housing is provided with lugs 32 arranged on opposite sides of the slit 29. These lugs and the key 30 are provided with openings in which a clamping bolt 33 is arranged for the purpose of clamping the housing against the bushing 24. The key 30 also acts as a filler between the lugs 32 and prevents the lugs from being drawn together to such an extent as to distort the bushing 24 and thereby bind the steering column.

On the lower side of the housing 19 and preferably formed integral therewith is a sector gear casing 34 which is provided with a circular flange 35. A bracket 36 is bolted to the frame 10 and has arranged on its inner side a circular flange 37 corresponding to the flange 35 on the sector gear casing. These flanges are provided with openings 38 for bolts which are adapted to clamp the sector gear casing against the bracket. The bracket 36 is preferably of rectangular form, as shown in Figs. 3 and 4 so that it may be arranged between the flanges of the vehicle frame.

The upper and lower flanges 39 and 40, respectively, of the bracket are provided with openings 41 for bolts which pass through the flanges of the frame. The bracket is provided with a transversely arranged bearing 42 in which is a bushing 43, the latter having an eccentric bore 44, as illustrated in Fig. 9. The bushing 43 is provided with an annular flange 45 having notches 46 formed in its periphery. The outer end of the bearing 42 is provided with ears 47 in which are arranged the pins 48. The pins 48 project through openings in the web of the vehicle frame and serve as means for centering the bracket. The casing 34 is provided with a bearing 49 in alinement with the bearing 42. In this bearing is arranged a bushing 50 having an eccentric bore and a notched flange to correspond with the bushing 43. A hollow sector shaft 51 is arranged in the bushings 43 and 50 and carries a sector gear 52 which engages the threads of the screw 20 on the steering column. A bolt 53 projects through the casing 34 and through an opening 54 in the bracket 36 and engages the notches 46 in the flanges of the bushings 43 and 50. The bolt 54, therefore, as will be readily understood, holds the bushings 43 and 50 against rotation. On account of the bushings having eccentric bores, it will be seen that the sector gear may be moved toward or away from the screw 20 by turning the bushing in the bearings 42 and 49. The shaft 51 projects through the frame 10 and carries on its outer end an arm 55 which is operatively connected with the steering wheels of the vehicle. This arm is preferably formed with a split hub and is adapted to be clamped on the shaft 51 by means of the bolt 56. In order to lubricate the shaft 51 openings 57 and 58 extend through the wall thereof at points approximately at the middle of the bushings 43 and 50. A grease cup 59 of any suitable construction is secured in the outer end of the shaft 51. The inner end of the shaft is provided with a suitable cap 60 which prevents the lubricant from escaping therefrom.

In the operation of the steering gear the interior of the shaft 51 will be filled with lubricant which will pass through the openings 57 and 58 and thus lubricate the exterior of the shaft. The lubricant will be forced through the openings 57 and 58 by means of the cup 59 which will also keep the interior of the shaft supplied with the lubricant.

The interior of the casing 34 and the portion of the housing 19 which surrounds the screw 20 will be filled with lubricant for the purpose of lubricating the screw and the sector gear. The upward thrust of the screw 20 is taken by the flange 61 on the lower section of the steering column, this flange bearing against the lower end of the bushing 24. In order to lubricate the bushing 24, it is provided with an annular groove 62 on its exterior and suitable transverse openings 63 which establish communication between said groove and the interior of the bushing. A boss 64 is formed on the upper end of the housing 19 at the front thereof and has secured thereto the upwardly extending bracket 65. An opening extends through the boss 64 and communicates with the groove 62 in the bushing 24 and has secured in its outer end the grease cup 66 for supplying lubricant to the bushing 24. Bell crank levers 67 and 68 are pivotally mounted on the bracket 65 and connected, respectively, with the spark and throttle regulating mechanisms. On the exterior of the steering column 13 and above the flange 16 sliding sleeves 69 and 70 are arranged. The sleeve 69 has loosely mounted on the exterior thereof, a split collar 71 which is pivotally connected with the lever 67, and the sleeve 70 is similarly provided with a collar 72 which is pivotally connected with the lever 68. Longitudinally movable rods 73 and 74 are arranged on the interior of the column 13 and connected respectively with the sleeves 71 and 72 by means of laterally extending pins 75 which extend through suitable slots in the steering column. The mechanism for moving the rods 73 and 74 is carried on the upper end of the steering column and preferably constructed, as shown in the patent to Schmidt No. 775,991. By this arrangement the rod 73 is shifted by means of a lever 76 and the rod 74 is shifted by means of a lever 77.

The arrangement of the parts as above described in which the sleeves 69 and 70 are located above the screw 20 and the sector 52 is located on the underside of the screw 20, permits the interior of the housing and the sector gear casing to be filled with lubricant and avoids the leakage of the same through the openings which must be provided in the steering column. The lubricant is prevented from working out through the lower end of the housing by means of a cap 78.

By mounting the parts on the frame of the vehicle, and independent of the engine, it will be seen that the engine may be removed from the vehicle without disturbing the steering column and the mechanism associated therewith. By having the steering column separable and connected together by means of the flanges 16 and 17, the upper part of the steering column may be removed whenever desired without disturbing the lower part and likewise the lower part may be removed without disturbing the upper part which would be retained in the bracket 14 carried by the dash.

It will be understood that various changes may be made in the details of the construction of the mechanism herein disclosed and described without departing from the spirit of the invention as defined in the appended claims and I therefore do not wish to be limited to the precise details which I have shown.

Having described my invention what I claim as new and desire to secure by Letters-Patent is, 1. In a motor vehicle, a steering post, steering mechanism operatively connected with the lower end of said post, control levers pivotally mounted adjacent said post, a plurality of movable rods within said post, and means operatively connecting said rods with said levers, and said post being separable into two sections at a point between said means and the connection with said mechanism.

2. In a motor vehicle, a steering post, steering mechanism operatively connected with the lower end of said post, control levers pivotally mounted adjacent said post, a plurality of longitudinally movable rods within said post, and means operatively connecting said rods with said levers above said steering mechanism, and said post being separable into two sections at a point between said means and the connection with said mechanism.

3. In a motor vehicle, a revoluble steering post, steering mechanism operatively connected with the lower end of said post, a fixed housing inclosing the lower end of said post and said mechanism, a plurality of control levers pivotally mounted on said housing, a plurality of longitudinally movable rods within said post, a plurality of independently movable sleeves on the exterior of said post above said housing, and connected with said rods, and means operatively connecting said sleeves with said levers, and said post being separable into two sections at a point between said sleeves and said housing.

4. In a motor vehicle, the combination with the dash and the frame, of a steering post revolubly mounted in said dash, a steering shaft mounted on said frame below said post, a screw on said post near its lower end, a sector gear on said shaft and engaging said screw, a housing mounted on said frame and inclosing said screw and gear, a plurality of control levers pivotally mounted on said housing, a plurality of movable rods within said post, sleeves slidably mounted on said post below said dash and operatively connected with said rods and said levers, and means whereby said post may be separated into two sections at a point between said sleeves and said screw.

5. In a motor vehicle, the combination with the frame, of a bracket supported thereby and provided with a bearing and a circular flange concentric therewith, a steering column, a housing inclosing a portion of the steering column and provided with a bearing in alinement with the bearing in said bracket, and a circular flange, adapted to coöperate with the flange on said bracket, means for securing said flanges together, a shaft mounted in said bearings, a steering arm on said shaft, and means within said housing for operatively connecting said shaft and said column.

6. In a motor vehicle, the combination with the frame, of a bracket supported thereby and provided with a bearing, a steering column, a housing for a portion of said column secured to said bracket and provided with a bearing in alinement with the bearing in said bracket, a screw on said column within said housing, eccentric bushings in said bearings, a shaft mounted on said bushings, a sector gear on said shaft and arranged to be actuated by said screw, and means for preventing said bushings from rotating.

7. In a motor vehicle, the combination with the frame, of a bracket supported thereby and provided with a bearing, a steering column, a housing for a portion of said column secured to said bracket and provided with a bearing in alinement with the bearing in said bracket, a screw on said column within said housing, eccentric bushings in said bearings provided with toothed flanges, a shaft mounted in said bushings, a sector gear on said shaft and arranged to be actuated by said screw, and means adapted to engage teeth on the flanges of said bushings to hold the latter against rotation.

8. In a motor vehicle, the combination with the frame, of a bracket supported thereby and provided with a bearing, a steering column, a housing for a portion of said column secured to said bracket and provided with a bearing in alinement with the bearing in said bracket, a screw on said column within said housing, eccentric bushings in said bearings provided with toothed flanges, a shaft mounted in said bushings, a sector gear on said shaft and arranged to be actuated by said screw, and a rod arranged parallel with said shaft and engaging teeth on the flanges of said bushings to hold the latter against rotation.

9. In a motor vehicle, the combination with the frame, of a bracket supported thereby, a steering column, a housing for a portion of the steering column, secured to said bracket, an adjustable bearing bushing in said housing for said column and provided with a toothed flange, said housing being provided with a longitudinal slit and outwardly projecting lugs on opposite sides of said slit, a member arranged in said slit and engaging teeth on the flange of said bushing, and a bolt passing through said lugs and adapted to clamp the housing on said bushing and hold said member in position.

In testimony whereof I affix my signature in presence of two witnesses.

RUSSELL HUFF.

Witnesses:
W. H. FINCKEL, Jr.,
E. A. KIEHN.